Oct. 5, 1926.

J. J. BARISCILLO

NOZZLE SPRAY

Filed Oct. 8, 1925

1,602,095

Inventor
JOHN J. BARISCILLO.

By Louis W. Schmutz
Attorney

Patented Oct. 5, 1926.

1,602,095

UNITED STATES PATENT OFFICE.

JOHN J. BARISCILLO, OF ASBURY PARK, NEW JERSEY.

NOZZLE SPRAY.

Application filed October 8, 1925. Serial No. 61,213.

This invention relates to new and useful improvements in spray nozzles and more particularly to a vaginal douche spray.

An important object of the invention resides in the provision of a vaginal douche spray having dilator arms arranged in spaced relation to a longitudinally curved irrigating tube and which arms are also curved longitudinally to parallel the tube.

Another important object of the invention is to provide a syringe nozzle embodying a central irrigating tube having a concave spraying end and dilator arms arranged in such relation to said spraying end, that the vaginal tissues are held away from said concave end and the spray orifices therein so that forceful streams of the douche liquid can be expelled and then find ready exit from the inner portion of the vaginal tract, between the dilator arms to permit complete flushing during irrigation, thereby preventing infection from retention of secretion and discharge.

A further object is to provide a device of the above character which consists of few and substantial parts, is simple and inexpensive to manufacture, and which is highly efficient in practice.

Other objects and advantages of the invention will become apparent to those skilled in the art of using such devices as the following description proceeds.

In the drawing, wherein for the purpose of illustration I have shown preferred embodiments of the invention, and wherein like numerals are employed to designate like parts throughout the several views.

Figure 1:
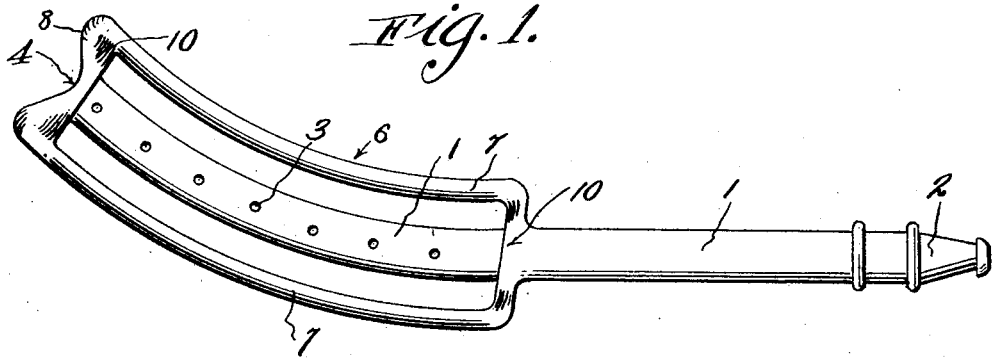
Figure 1 is a side elevation of my improved curved vaginal spray nozzle.
Figure 2:
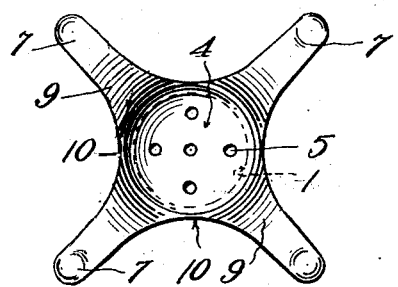
Figure 2 is an end elevation of the same.
Figure 4:
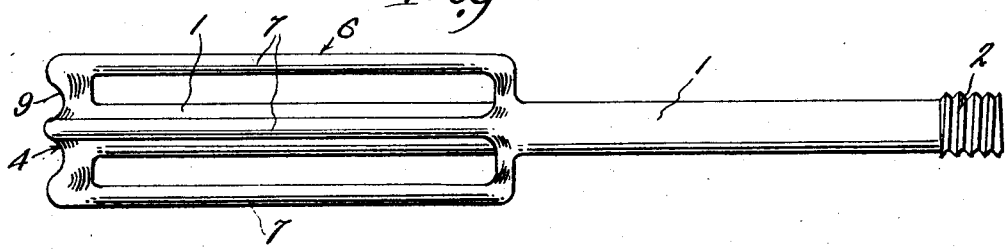
Figure 4 is a side elevation of another embodiment of my invention.

Referring now more particularly to the drawing, the numeral 1 designates an elongated hollow irrigating tube, which may be straight as shown in Figure 4, or partly curved longitudinally as illustrated in Figure 1, and which has its syringe tube attaching end 2 provided with any suitable means for attachment to the syringe tube, not shown. This end is here illustrated in Figure 1, as being tapered in the usual manner or, as shown in Figure 4 as having screw threads. Beginning approximately half way the length of this tube 1 and extending to the outer end thereof, lateral orifices 3 are provided therein at spaced intervals and in spaced rows circumferentially as clearly shown. The outer end of the tube is concave as at 4 and is equipped with forwardly directed orifices 5; there preferably being five in number, one being located centrally of and equi-distant from the other four which are disposed equi-distant from each other as shown, for a purpose which will be presently described.

In order to prevent the vaginal tissues from contacting directly with the orifices of the irrigating tube and to facilitate rapid discharge of the cleansing fluid into and out of the vaginal tract, a dilator cage designated in its entirety by the numeral 6, is provided to surround the perforated part of the tube 1 in spaced relation thereto. This cage is formed by a plurality of dilator arms 7 which are arranged in spaced relation to the tube and to each other circumferentially of the tube; there being four in number in the present instance, although a greater or less number may be provided without departing from the scope of this invention.

The ends of each dilator arm 7 are angularly disposed inwardly toward the tube 1 as at 8 to connect with the same. It will be particularly noted that the outer end 9 of each dilator arm 7 extends beyond the outer end of the irrigating tube and is then curved rearwardly and inwardly to extend toward the center of the tube to be joined thereto, the purpose being to cause the outer ends of these arms to form with the concaved end 4 of the tube, a concavity in which the orifices 5 are located, whereby the vaginal tissues are held away from these orifices so as not to interfere with the streams of douche fluid issuing therefrom. Also, this construction coupled with the fact that the surfaces 10 between the ends of the dilator arms where they join the tube, are concaved transversely of the spray to form rounded grooves, permits the fluid to thoroughly flush the tract and pass unobstructedly to the mouth thereof.

The cage 6 may be formed as one piece and separate from the irrigating tube to be slipped thereon and attached thereto by suitable means, or the dilator arms may be formed integral and in one piece with the tube 1, or may be made separately and independently united to the tube in any suitable manner.

Figure 3:
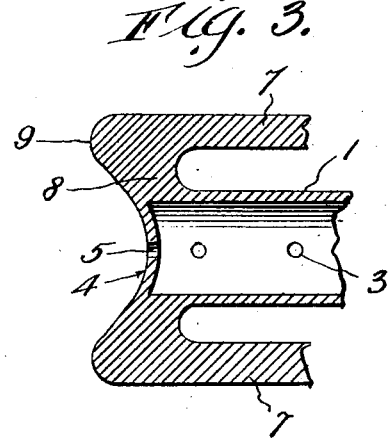
Figure 3 is a fragmentary section through the outer end of the spray.

It will be particularly noted in Figure 3, that the outer end surfaces of the dilator arms are inclined and slightly concaved to merge into and conform or continue the curvature of the concaved end of the tube 1. This construction is provided, not only to hold the tissues away from the nozzle, but to provide the nozzle with curved surfaces and to eliminate all crevices and corners in which infectious matter would be apt to lodge and render such a nozzle highly unsanitary. With my present construction wherein the dilator arms merge into the walls of the concave end 4 of the tube and the surfaces 10 between the arms, a highly sanitary nozzle is formed which can be easily and thoroughly cleaned after each treatment.

It will be observed in Figure 1 that the dilator arms are curved longitudinally to conform to and parallel the tube. I am aware of prior dilating nozzles of the type shown in Dr. Spencer's Patent 577,524 and others, and believe that I am the first to provide one in which both the dilating arms and irrigating tube are curved longitudinally with the arms arranged in spaced relation to the tube.

It is to be understood that the form of my invention herewith shown and described is to be taken as the preferred example of the same and that various changes in the shape, size, or arrangement of parts may be resorted to without departing from the spirit of the invention or the scope of the appended claims.

I claim:

1. A nozzle spray comprising in combination, a tube having its outer end concaved and perforated, a plurality of dilator arms arranged in spaced relation circumferentially of the tube and to each other, the outer ends of said arms projecting beyond the tube and curved rearwardly and inwardly toward the outer end of the tube to join with the same to form a concavity, and the surfaces between the ends of said arms being concaved transversely of the nozzle.

2. A nozzle spray comprising in combination, a tube having its outer end concaved and perforated, and dilator arms carried by the tube in spaced relation thereto, the outer end surfaces of said arms being curved inwardly to join and conform to the curvature of the concaved end of said tube.

3. A nozzle spray comprising in combination, a tube having its outer end concaved and perforated, a plurality of dilator arms arranged longitudinally and circumferentially of the tube in spaced relation thereto and to each other, the outer ends of said arms projecting beyond the concaved end of the tube, said ends of the arms being curved inwardly and inclined and slightly concaved to merge into and conform to the curvature of the concaved end of said tube to provide a smooth uninterrupted concave surface.

In testimony whereof I hereunto affix my signature.

JOHN J. BARISCILLO.